United States Patent Office 3,121,735
Patented Feb. 18, 1964

3,121,735
PRODUCTION OF MONOCHLOROACETONITRILE
Joseph P. Henry, South Charleston, and Jared W. Clark, Charleston, W. Va., assignors to Union Carbide Corporation, a corporation of New York
No Drawing. Filed Jan. 5, 1961, Ser. No. 80,752
5 Claims. (Cl. 260—465.7)

This invention relates, in general, to a method for producing monochlorinated aliphatic nitriles. In one aspect, this invention relates to a novel process for the preparation of monochloroacetonitrile.

Heretofore, monochloroacetonitrile has been prepared by a variety of known methods. Principally, the monochlorinated derivative has been synthesized by the dehydration of monochloroacetamide with phosphorous pentoxide as reported by Steinkopf, Ber., 41, 2540 (1908) and Organic Synthesis, 30, 22 (1950). Other known syntheses have involved the reaction of glycinonitrile hydrochloride with nitrosyl chloride, or the treatment of the hydrochloride of aminoacetonitrile with sodium nitrite followed by conversion of the resulting diazoacetonitrile to the chloroacetonitrile.

More recently, however, chlorinated acetonitriles have been prepared by a vapor-phase chlorination of acetonitrile in the presence of a catalyst comprising a noble metal or an oxide, hydroxide, or salt of a noble metal. Active carbon or carbon impregnated with an alkaline earth metal have also been utilized as chlorination catalysts. However, by the aforementioned methods trichloroacetonitrile and unreacted acetonitrile are substantially the only products isolated.

Accordingly, one or more of the following objects will be achieved by the practice of the instant invention. It is an object of the present invention to provide a novel process for the preparation of a chlorinated aliphatic nitrile. It is another object of this invention to provide a novel process for the preparation of monochloroacetonitrile. A still further object is to provide a novel process for the preparation of monochloroacetonitrile with a minimum formation of polychlorinated derivatives. A further object is to provide a novel process for the preparation of monochloroacetonitrile in relatively high yields. Another object of the present invention is to provide a novel process for the preparation of monochloroacetonitrile in efficiencies of about 90 percent, based on the acetonitrile consumed. These and other objects will readily become apparent to those skilled in the art in the light of the teachings herein set forth.

In its broad aspect, this invention is directed to a novel process for the preparation of a monochlorinated aliphatic nitrile. The process comprises contacting vaporous acetonitrile with a chlorinating agent under turbulent flow conditions at a temperature of from about 300° to about 500° C. for a period of time from about 1 to about 20 seconds, the acetonitrile and chlorine being present in a respective mole ratio of 3:1 or higher.

The present invention is therefore based, in part, on the discovery that acetonitrile can be chlorinated under the specific conditions hereinafter described to produce the monochloroacetonitrile to the virtual exclusion of any polychlorinated products. The absence of any substantial quantity of polychlorinated acetonitrile is indeed unexpected and surprising inasmuch as the prior known methods for chlorinating aliphatic nitriles inevitably resulted in only the trichloro derivatives and unreacted nitrile.

Furthermore, the discovery that monochlorinated derivatives of acetonitrile can be produced efficiently by the direct chlorination of acetonitrile was not thought feasible due to the formation of predominently trichloroacetonitrile and the inability to convert it to the monochlorinated product. Thus, the formation of any polychlorinated derivatives actually represented a loss of starting material. Earlier attempts at a liquid-phase chlorination of acetonitrile also gave trichloroacetonitrile as the major product. The absence of the monochloro derivatives was indicative of the relatively slow reaction rate of the initial chlorination to give the monochloro derivative as compared to the relatively fast reaction rate of subsequent chlorination to the dichloro and trichloro derivatives.

The present invention contemplates the steps of preheating the acetonitrile reactant to a vaporous state and thereafter adding the chlorine to the preheated stream. The resulting mixture of acetonitrile and chlorine is thereafter conducted through an externally heated reactor under turbulent flow conditions at a total residence time in the reactor of not more than 20 seconds. Conducting the reaction under turbulent flow conditions has been found particularly advantageous to the production of monochloroacetonitrile in efficiencies of about 90 percent, based on the acetonitrile consumed. It is particularly surprising that such high efficiencies can be obtained while at the same time the formation of any polychlorinated product is substantially minimized.

For practical purposes, process conditions are balanced so that high efficiencies are achieved in a single pass. It has been found desirable to limit the single pass conversion of acetonitrile to about 30 percent to minimize formation of undesirable polyhalogenated derivatives. Of course, unconverted acetonitrile can be recycled to the reactor and the overall conversion increased thereby. Excellent results are obtained at the low conversion rates and short residence or contact times.

In a preferred embodiment of the present invention it was found that efficiencies of about 90 percent can be obtained, based on the amount of acetonitrile consumed, by conducting the chlorination in the vapor phase and under the conditions hereinafter described. In practice, it was found desirable to employ a coil-type tubular reactor maintained at a temperature of from about 300° C. to about 500° C. and more preferably from about 350° C. to about 475° C. Temperatures above the aforesaid broad range can also be employed but are less preferred. Acetonitrile was fed to a preheater and vaporized. Although the temperature of the preheater is not critical, it should be sufficiently high to insure that the acetonitrile feed is maintained in the vapor state. As the pressure in the vaporizer increases due to the increased turbulence in the reactor, the boiling point of the acetonitrile will increase, thus necessitating higher temperatures in the preheater. In general, it has been found that a preheater temperature of from about 200° to about 225° C., and higher, was suitable for this purpose. The vaporized acetonitrile was then passed to the inlet end of the reactor. Chlorine was fed to the inlet of the reactor where it was mixed with the vaporous acetonitrile in a ratio of not less than three moles of acetonitrile to one mole of chlorine. In practice, the mole ratio of acetonitrile to chlorine should be maintained within the range of from about 3:1 to about 10:1. The mixed vapors subsequently passed through the reaction zone under turbulent flow conditions. In practice, turbulent flow conditions, expressed in Reynolds numbers, should be maintained within the range of from about 2,000 and lower, to about 20,000 and higher and more preferably from about 3,000 to about 19,000. The reaction product, comprising essentially monochloroacetonitrile, unreacted acetonitrile, hydrogen chloride and traces of unreacted chlorine, was passed from the reactor to a let-down pot wherein the now liquid condensate was first stripped of unreacted acetonitrile in a glass-packed still, and the residue thereafter distilled to isolate the monochloroacetonitrile from any small amounts of dichloroacetonitrile.

It is critical in the operation of the process of the instant invention that both the ratio of chlorine to acetonitrile and full turbulent flow conditions be maintained within the aforementioned ranges to minimize polyhalogenation. Furthermore, the total contact time required for substantially complete chlorine consumption should be 20 seconds or less and preferably from about 1 to about 20 seconds. Since the contact time is a function of the length of the reactor and the linear velocity of reactants, either factor can be so adjusted as to provide the desired contact time.

The reactor employed in this process can be externally heated to maintain the reactants in the vapor phase. This can be accomplished by jacketing the reactor tube or vessel in one or several sections or by arranging the reactor tube in the form of a coil or bundle contained in a vessel in which a heating fluid surrounds the tubes. It has been found advantageous to maintain a nearly constant temperature throughout the reactor. This can be conveniently accomplished by having the heating zone divided into sections and independently controlled at the desired temperature in the several sections. In this manner, localized overheating or cooling can be avoided.

While the maintenance of a nearly constant reaction temperature throughout the entire length of the reactor is desired, it is possible in this process to have a temperature variation through the reactor of about 10° C. or higher without great change in productivity and conversion efficiency. At temperatures much below 350° C. the contact time required for complete consumption of the chlorine becomes prohibitive, particularly if turbulent flow conditions are to be achieved.

The linear velocity of the reaction mixture through the reactor is dependent upon the reaction temperature and reactants employed. The linear velocity should be such that full turbulent flow is obtained and total residence or contact time in the reactor is about 20 seconds or less. Turbulent flow with the corresponding reaction temperature and residence time permits monochlorination of up to 33 percent of the acetonitrile reactant. The necessary linear velocity in this system is thus determined, in part, by the heat transfer capacity of the reactor as governed by the heat transfer rate, surface area, temperature of jacket or heating bath, and other considerations.

The chlorination reaction is generally carried out in conventional vapor-phase reactors such as tanks, towers, or tubular reactors particularly designed to maintain necessary pressures and temperatures of the reaction. Inasmuch as the reaction rate is relatively slow with respect to the initial chlorination, the chemical reaction rate is a controlling factor of the process. For such a reaction, the rate determined, in part, the design of equipment and manner of operation of the process.

Due to the corrosive nature of liquid acetonitrile and substituted acetonitriles on metal in the presence of hydrogen chloride or chlorine, the materials comprising the reaction equipment must be selected with care. Glass or glass-lined equipment is necessary at any point in the system where there is liquid in contact with, or having dissolved therein chlorine or hydrochloric acid. No corrosion difficulties are encountered if the reactants come into contact with metal while in the vapor state or with glass while in the liquid state. If unreacted acetonitrile is recycled to the vaporizer-preheater and thence to the reactor, it is preferred to remove any residual hydrochloride acid or chlorine to minimize corrosion. Nickel tubing was found ideally suited for the reactor. The particular length and diameter of tubing employed will depend, in part, upon the heat transfer area required as well as the desired residence time in the reactor. In practice, both one-eighth inch and one-half inch nickel pipe having lengths of up to 60 feet and 196 feet respectively, have been found suitable. The tubing can be arranged in any convenient manner to secure the desired length, for instance, in coils, banks of tubes, or in one straight section.

Although the instant process is also operable in the presence of vapor phase chlorination catalysts, an outstanding feature of the present invention is the ability to effect conversion of acetonitrile to the monochlorinated derivative in the absence of catalysts. Suitable chlorination catalysts which can be employed if desired include, among others, active carbon, active carbon impregnated with barium chloride, silver, platinum, palladium, rhodium, gold, or inorganic salts thereof. The catalysts can be employed either with or without support, in a porous form, or supported on a porous carrier such as pumice, silica gel and the like.

In addition to chlorine, other chlorination agents can equally as well be employed, the only requirement being that the agent vaporizes within the aforementioned reaction temperature range. Phosgene, sulfuryl chloride, and the like are illustrative of such agents.

Due to the presence of the cyano and halogen groups, monochloroacetonitrile is particularly useful in those instances wherein a difunctional molecule is desired. For example, the cyano group will undergo the customary nitrile reactions and the halogen group can undergo nucleuophilic substitution. Monochloroacetonitrile has also shown utility as an insecticide and as a solvent for the polymerization of acrylonitrile. Additionally, this compound is of interest as an intermediate in the pharmaceutical and chemical industries.

The following examples are illustrative:

EXAMPLES 1-7

Chlorination of acetonitrile was conducted in a one-eighth inch, nickel pipe, coil type reactor. The reactor was immersed in an electrically heated salt bath maintained at reaction temperature, i.e. about 450° C. Chlorine was fed from a weighed cylinder through a calibrated flow meter to the top of the coil. Acetonitrile was pumped from a graduated feed tank through a steel vaporizer-preheater maintained at 200-225° C., and the vapors mixed with chlorine at the top of the reactor. The mixture was then passed through the reactor under turbulent flow conditions and a total residence time of less than 20 seconds. The outlet end of the reactor was equipped with a metal ball-joint which connected to glass tubing leading to a let down pot. The let down pot consisted of a two-liter flask equipped with a 1 x 15-inch, glass-packed column and a water-cooled condenser. The blow-off from this condenser passed to a water scrubber. Any gases passing through the scrubber were dried with calcium chloride and condensed in Dry Ice-acetone cooled traps. The water from the scrubber was collected in polyethylene bottles and analyzed for acid content.

When it was desired to remove the organic material carried out by the hydrogen chloride gas, a Dry Ice-acetone trap was inserted in the line between the condenser and the water scrubber. At the end of the run, this trap was protected from light, and the dissolved hydrochloric acid and chlorine distilled off very slowly through a scrubber. The organic residue was stripped to remove any trichloroacetonitrile and the remainder of the liquid added to the material in the let down pot. The liquid condensate which collected in the let-down pot was stripped of unreacted acetonitrile in a glass-packed still, and the residue distilled on an efficient column to isolate the mono- and dichloroacetonitriles. Because of the peculiar boiling point sequence that exists in the chlorinated acetonitriles, dichloroacetonitrile was removed at 75° C. at a pressure of 200 millimeters of mercury and the monochloroacetonitrile at 84° C. at the same pressure. Refractive index, mass spectra and gas chromatograph were utilized for analysis of the individual fractions obtained.

The experimental conditions used during the runs together with the results obtained are summarized in Table I which follows:

*Table I.—Chlorination of Acetonitrile*

| Example | Temperature (° C.) | Contact Time (seconds) | Run Duration (hours) | Mole Ratio (Acetonitrile: chlorine) | Material Balance (weight percent) | Efficiency Based on Converted Acetonitrile in percent | Product Mole Ratio (mono:di)a |
|---|---|---|---|---|---|---|---|
| 1 | 450 | b 2 | 4.5 | 3 | 93.2 | 57.9 | 7.1:1 |
| 2 | 450 | b 3 | 3.75 | 3 | 95.4 | 68.0 | 6.8:1 |
| 3 | 450 | 2 | 4.5 | 5 | 95.2 | 67.5 | 12.8:1 |
| 4 | 450 | 3 | 3.75 | 5 | 96.0 | 70.7 | 9.5:1 |
| 5 | 450 | b 1 | | 10 | 88.2 | 66.7 | c 30.2:1 |
| 6 | 450 | 2 | 4.0 | 12 | 96.8 | 74.0 | c 21.5:1 |
| 7 d | 450 | 3 | 4.0 | 5.8 | 100 | 92.2 | 11.4:1 | a Based on mass spectra of liquid product.
b Some unreacted chlorine recovered at these contact times.
c Based on mole ratio of isolated products.
d A −80° C. condenser employed to strip the hydrogen chloride gas.

Examples 1–6 were conducted without making provisions for complete stripping of the organic product from the evolved hydrogen chloride gas. A water-cooled condenser was employed to liquify the high boiling product and most of the unreacted acetonitrile. The remainder of the acetonitrile was carried into the water scrubber. Inasmuch as some organic product was evolved with the hydrogen chloride, the losses of this uncondensed organic feed are reflected in the material balances and lower efficiencies as noted in Table I. However, when a −80° C. condenser was employed in Example 7 to efficiently strip the hydrogen chloride gas, efficiencies in excess of 90 percent were obtained.

Of course, the efficiency of the process depends upon the product distribution obtained as well as upon the organic feed recovered. As noted in the last column of Table I, the mole ratio of monochloroacetonitrile to dichloroacetonitrile increases as the mole ratio of acetonitrile to chlorine increases. This is noteworthy inasmuch as the proximity of the boiling points of the monochloro and dichloro derivatives necessitates the use of an efficient distillation column to achieve complete separation. For example, at a pressure of 200 millimeters of mercury the relative volatility of these components is about 1.25. Thus, unless a fractionating column with a large number of theoretical plates is used, the amount of pure monochloroacetonitrile will vary inversely with the amount of the dichloro-derivative present.

EXAMPLES 8–12

Chlorination of acetonitrile was conducted in a one-half inch by 196 feet nickel pipe formed into double coils, 12 inches and 8 inches in diameter, each having 36 turns. This coil was immersed in an electrically heated salt bath. The bath was wound with resistance wire capable of producing 7500 watts, and insulated both electrically and thermally. The reaction was conducted in a manner similar to that described in Examples 1–7 except that reaction temperature was approximately 465° C. and the mole ratio of acetonitrile to chlorine was 5 to 6:1. Purification of the crude monochloroacetonitrile was accomplished by distillation at a pressure of 150 millimeters of mercury.

The experimental conditions employed during the runs together with the results obtained are summarized in Table II which follows:

*Table II.—Chlorination of Acetonitrile*

| Example | Temperature (° C.) | Mole Ratio (Acetonitrile: chlorine) | Yield of Monochloroacetonitrile Based on Chlorine (in percent) | Efficiency Based on Converted Acetonitrile (in percent) | Product Mole Ratio (Mono:di) a |
|---|---|---|---|---|---|
| 8 | 468 | 5.48 | 58.9 | 96.0 | 11.50 |
| 9 | 463 | 5.62 | 59.4 | 87.8 | 13.00 |
| 10 | 460 | 5.91 | 41.3 | 87.9 | 7.40 |
| 11 | 457 | 4.67 | 42.6 | 100.0 | 8.25 |
| 12 | 471 | 4.76 | 41.8 | 94.5 | 9.08 | a Based on mass spectra of liquid product.

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for the production of monochloroacetonitrile which comprises the steps of: preheating acetonitrile to a temperature sufficient to vaporize said acetonitrile; adding a chlorinating agent selected from the group consisting of chlorine, phosgene and sulfuryl chloride, to said vaporized acetonitrile in a mole ratio of not less than three moles of acetonitrile to one mole of chlorinating agent; conducting the resulting mixture of acetonitrile and chlorinating agent through a reactor, maintained at a temperature of from about 300° to about 500° C., under turbulent flow conditions and at a total residence time of said mixture in said reactor of not more than 20 seconds; and thereafter recovering monochloroacetonitrile.

2. A process for the production of monochloroacetonitrile which comprises the steps of: preheating acetonitrile to a temperature sufficient to vaporize said acetonitrile; adding chlorine to said vaporized acetonitrile in a mole ratio of not less than three moles of acetonitrile to one mole of chlorine; conducting the resulting mixture of acetonitrile and chlorine through a reactor, maintained at a temperature of from about 300° to about 500° C., under turbulent flow conditions and at a total residence time of said mixture in said reactor of not more than 20 seconds; and thereafter recovering monochloroacetonitrile.

3. A process for the production of monochloroacetonitrile which comprises the steps of: preheating acetonitrile to a temperature sufficient to vaporize said acetonitrile; adding chlorine to said vaporized acetonitrile in a mole ratio of acetonitrile to chlorine of from about 3:1 to about 10:1; conducting the resulting mixture of acetonitrile and chlorine through a reactor, maintained at a temperature of from about 300° to about 500° C., under turbulent flow conditions and at a total residence time of said mixture in said reactor of not more than 20 seconds; and thereafter recovering monochloroacetonitrile.

4. A process for the production of monochloroacetonitrile which comprises the steps of: preheating acetonitrile to a temperature of from about 200° to about 225° C., adding chlorine to said acetonitrile in a mole ratio of acetonitrile to chlorine of from about 3:1 to about 10:1; conducting the resulting mixture of acetonitrile and chlorine through a reactor, maintained at a temperature of from about 300° to about 500° C., under turbulent flow conditions characterized by a Reynolds number of from about 2000 to about 20,000 and at a total residence time of said mixture in said reactor of not more than 20 seconds; and thereafter recovering monochloroacetonitrile.

5. A process for the production of monochloroacetonitrile which comprises the steps of: preheating acetonitrile to a temperature of from about 200° to about 225° C., adding chlorine to said acetonitrile in a mole ratio of acetonitrile to chlorine of from about 3:1 to about 10:1; conducting the resulting mixture of acetonitrile and chlorine through a reactor, maintained at a temperature of from about 350° C. to about 475° C., under turbulent flow conditions characterized by a Reynolds number of from about 2000 to about 20,000 and a total residence time of said mixture in said reactor of not more than 20 seconds; and thereafter recovering monochloroacetonitrile.

References Cited in the file of this patent

FOREIGN PATENTS 574,280   Great Britain _____ Dec. 31, 1945